United States Patent [19]

Clara et al.

[11] Patent Number: 5,214,771
[45] Date of Patent: May 25, 1993

[54] SYSTEM FOR LOADING SAME TYPE ADAPTORS WITH LATEST VERSION CONTROL CODES STORED ON ADAPTOR MEMORY BY SELECTING THE IDENTIFIED CHIP DURING INITIALIZATION

[75] Inventors: Jean-Louis Clara, La Colle sur Loup; Philippe Jachimczyk, Saint Jeannet; Jean-Freancois Le Pennec, Nice; Louis Massiera, Levens; Philippe Therias, Nice, all of France

[73] Assignee: International Business Machines Corp., Armonk, N.Y.

[21] Appl. No.: 401,895

[22] Filed: Sep. 1, 1989

[30] Foreign Application Priority Data

Apr. 19, 1989 [EP] European Pat. Off. .......... 89480056

[51] Int. Cl.⁵ .................. G06F 9/06; G06F 12/06
[52] U.S. Cl. ................... 395/500; 364/238.5; 364/254.4; 364/268.3; 364/280.2; 364/259.4; 364/929.4; 364/929; 364/957.2; 364/975.1; 364/975.2; 364/DIG. 1; 364/DIG. 2; 395/425
[58] Field of Search ... 364/200 MS File, 900 MS File; 395/200, 500, 400, 425, 200, 500, 575

[56] References Cited
U.S. PATENT DOCUMENTS

| | | | |
|---|---|---|---|
| 4,263,650 | 4/1981 | Bennett et al. | 364/200 |
| 4,268,901 | 5/1981 | Subrizi et al. | 364/200 |
| 4,281,315 | 7/1981 | Bauer et al. | 340/147 R |
| 4,323,965 | 4/1982 | Johnson et al. | 364/200 |
| 4,481,579 | 7/1982 | Kinghorn | 364/200 |
| 4,562,535 | 12/1985 | Vincent et al. | 364/200 |
| 4,589,063 | 5/1986 | Shah et al. | 364/200 |
| 4,649,514 | 3/1987 | Berger | 364/900 |
| 4,701,878 | 10/1987 | Günkel et al. | 364/900 |
| 4,727,475 | 2/1988 | Kiremidjian | 364/200 |
| 4,747,073 | 5/1988 | Desbois et al. | 364/900 |
| 4,750,136 | 6/1988 | Arpin et al. | 364/514 |
| 4,803,623 | 2/1989 | Klashka et al. | 364/200 |
| 4,825,358 | 4/1989 | Letwin | 364/200 |
| 4,847,830 | 7/1989 | Momirov | 370/94 |
| 4,914,576 | 4/1990 | Zelley et al. | 364/200 |
| 4,918,598 | 4/1990 | Ashkin et al. | 364/200 |
| 4,935,863 | 6/1990 | Calvas et al. | 364/138 |

*Primary Examiner*—Thomas C. Lee
*Assistant Examiner*—Ken S. Kim
*Attorney, Agent, or Firm*—Edward H. Duffield

[57] ABSTRACT

Memory and peripheral chip select apparatus for allowing the addressing of different memory and peripheral elements by a processor. The different memory and peripheral elements include first memory elements and first peripheral elements located in a first adapter pluggable into a base machine and second memory elements and second peripheral elements located into a second adapter pluggable into the base machine. The processor further addresses third memory elements and third peripheral elements located in the base machine. The first and second memory elements include code which has a determined type and a determined level of release. The invention is characterized in the fact that it further includes a mechanism for reading the type and the level of the release of said code included in one of said first and second adapters and mechanisms responsive to said reading and operating when said codes of both of said first and second adapters are of the same type for selecting that code of said first or second memory which has the code of higher level of release when said processor desires to access the code of a given type in one of said adapters.

8 Claims, 10 Drawing Sheets

FIG. 2
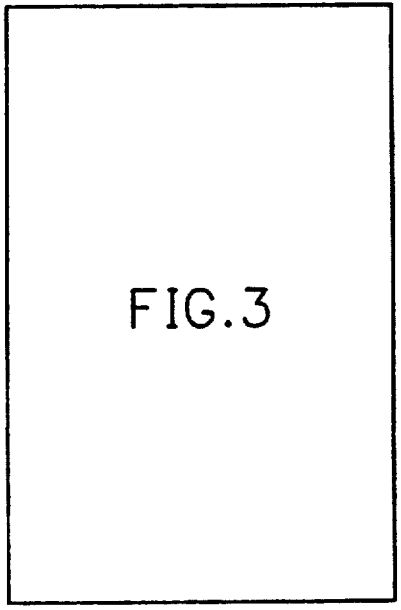
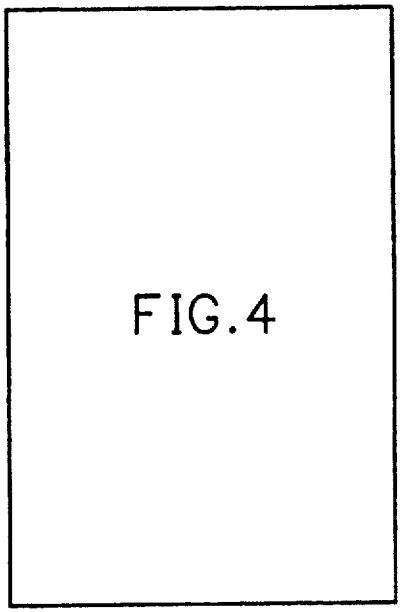
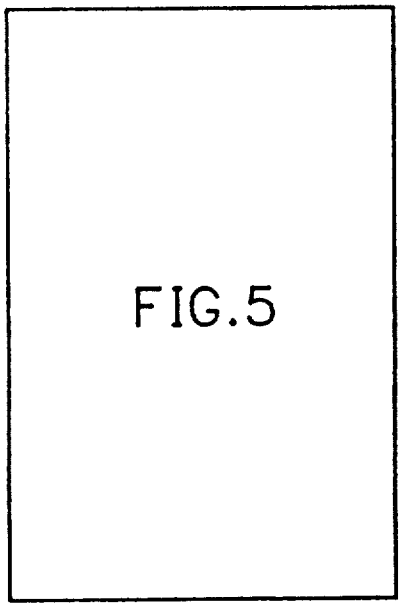
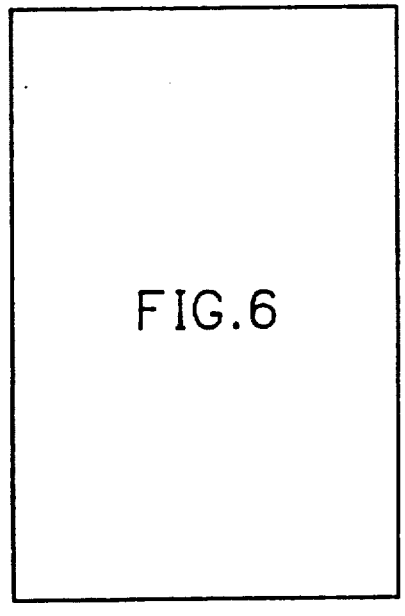

SYSTEM FOR LOADING SAME TYPE ADAPTORS WITH LATEST VERSION CONTROL CODES STORED ON ADAPTOR MEMORY BY SELECTING THE IDENTIFIED CHIP DURING INITIALIZATION

TECHNICAL FIELD OF THE INVENTION

The present invention relates to data processing systems and particularly to processor based systems designed to be connected to pluggable electronic modules including memory and peripheral elements.

PRIOR ART

The configuration of multipurpose data processing systems to individual needs or requirements, by adding peripheral modules, herein called adapters, such as video display devices, disk data storage devices, printer communication facilities or telecommunication adapters and the like, is often required.

The addition of new capabilities to the multipurpose system, herein called a base machine, or more generally the personalization of the latter, requires the plugging of interface adapters into the available slots of the board of the base machine.

However, after each "module addition" or "subtraction", the processor included in the base machine must be able to address separately every interface adapter plugged on the board of the base machine.

The problem of address allocation is well known, and many solutions actually exist.

European Patent Application EP-A- 265 575 owned by IBM describes, in addition to several systems of the prior art allowing address allocation of interface cards, a data processing system having automatic address allocation arrangements for addressing interface cards. The system described in this document allows the plugging of one or several cards, similar or different in the slots available irrespective of their location on the board of the system. However, this system, and more generally the prior art systems, have particularly three distinctive limitations:

First, although the EP-A-265 575 system allows the simultaneous addressing of two similar adapters, each adapter containing code stored in Read Only Memory elements (RO), the operation of each is strictly dependent on its associated code included therein and is independent of the existence of the code included in the other adapter. The system therefore does not take into account the possible existence of two similar codes, but having different releases; that is to say manufactured at different times and being at different levels of sophistication due to the continuous progress of advanced technology. Therefore, in the prior art systems, the operating of a determined adapter is controlled by the corresponding code stored in it, irrespective of its level of update.

Let us assume that a customer having already plugged for some years an adapter of a definite type (telecommunication adapter for instance) wishes to add a second interface adapter of the same type. Assume also that the latter interface adapter, although providing the same functions, is characterized by a higher level of release of the code included therein, due to a likely update of the code and the software contained into the ROM elements included in the more recent interface adapter Now, the base machine is personalized with two interface adapters having a similar type, but each one being a different level of release, it is highly desirable that the base machine be able to detect the more recent interface adapter and to choose the corresponding code included therein in order to control the operating of both interface adapters, thereby taking profit of the updated technology for both. The same problem requests a solution whenever a PROM included into one adapter is defective, thus entailing a failure in the corresponding adapter. In the latter case, it is also desirable that the memory and peripheral chip select apparatus be able to substitute the PROM element existing in the other adapter in order to control the operation of both adapters.

Furthermore, assuming that two adapters of the same type are plugged into the base machine, the two peripheral elements included therein and which are naturally associated with the same range of addresses, are both likely to generate interruptions to the processor included in the base machine. Therefore, the processor and the main program have to manage the interruptions, which may overlap or not, and which are generated by the latter peripheral elements. Indeed, when a determined adapter generates an interruption to the processor, the latter must distinguish the peripheral element having generated the interruption from the other. This management task generally requires in the prior art systems that the main program or software be designed for all possible variations and combinations of adapters. It is therefore highly desirable to provide a memory and peripheral chip select apparatus allowing the main program to be designed as if only one adapter were plugged into the base machine.

Furthermore, EP-A-265 575 system does not allow, when used in the telecommunication field for providing a base machine designed to receive pluggable adapters characterized by a determined CCITT protocol, the operation of the adapters, initially designed to be controlled by the code included therein, by a patch code directly loaded into the base machine. Indeed, in the field of telecommunication products, there may be cases when the codes or a part of the codes can be loaded directly through the telecommunication network into the base machine. The prior art system does not allow that code stored in the base machine to be operated by means of some address allocation arrangements, in place of the code still loaded in the adapter.

OBJECTS OF INVENTION

It is an object of the invention to provide an improved memory and peripheral chip select apparatus for allowing the plugging of adapters into a base machine and to provide, when two adapters of the same type are plugged, the detection of the code stored in the adapter which has the higher level of release, in order to control the operating of all adapters with the more recent code.

It is another object of the invention to provide an improved memory and peripheral chip select control apparatus for equipment allowing the connection of a DTE to a telecommunication network and providing the possibility of updating the codes included in both the base machine and the adapters by patch routines directly transmitted through the telecommunication network.

It is a further object of the invention to provide an improved memory and peripheral chip select control apparatus allowing easy succession of the different interruptions generated by the different peripheral elements included in the adapters without necessitating that the main control program take into account and manage either the location where the interruptions are generated or the number of adapters.

BRIEF SUMMARY OF THE INVENTION

The objects of the invention are achieved by means of the memory and peripheral chip select apparatus according to the invention allowing the addressing of different memory and peripheral elements by a processor. The different memory and peripheral elements include a first memory element and first peripheral element located in a first adapter pluggable into a base machine and second memory elements and second peripheral elements located in a second adapter pluggable into the base machine. The processor further addresses third memory elements and third peripheral elements located into the base machine. The first and second memory elements include code which have a determined type and a determined level of release. The invention is characterized in the fact that it further includes means for reading the type and the level of the release of said code included in one of said first and second adapter, and means responsive to said reading and operating when said codes of both of said first and second adapters are of the same type for selecting the code of said first or second memory means which has the higher level of release when said processor desires to access the code of a given type in one of said adapters.

BRIEF DESCRIPTION OF THE DRAWINGS

FIG. 2 describes the arrangement of FIG. 3, FIG. 4, FIG. 5 and FIG. 6 in order to provide an extensive view of the apparatus according to the invention.

DESCRIPTION OF THE PREFERRED EMBODIMENT

The preferred embodiment of the invention will refer below to the telecommunication field and particularly to a Terminal Adapter for an I.S.D.N network. With this assumption, the above base machine should be considered as a telecommunication equipment designed to receive pluggable adapters, each adapter allowing the connection of one Data Terminating Equipment (DTE) to the telecommunication network. Indeed, the latter networks are widely spreading, and allow the connection and the communication between numerous equipments having different protocols such as V24, V35, X21 CCITT recommendations. In order to allow manufacturing cost reduction, telecommunication products suppliers tend to provide equipments in large quantities, which equipments are nevertheless expected to satisfy numerous different requirements and protocols.

For instance, with respect to the concept of Integrated Services Digital Networks (I.S.D.N.) resulting from the on-going process of digitalization of telephone networks, the customer will be allowed to access large public telecommunication services. Telecommunication suppliers will therefore have to widely market equipments, commonly known as Terminal Adapters (TA) in the I.S.D.N. field, designed to allow the I.S.D.N. network connection for a large quantity of telecommunication DTE's having different protocols such as V24, V35 . . . as defined by the CCITT. Those TA may involve modular elements, or functional packages herein called adapters, containing electronic components specific to particular protocols. Such adaptors, when plugged into a base machine, will allow the connection of a particular Data Terminating Equipment (DTE) to the ISDN network. Since such products are intended to be used by the general public, a need has appeared for a system for allowing the plugging of an adapter into a base card irrespective of the physical location on the board or in the different slots available in the base machine. The need also has appeared for providing management of the possible existence of two adapters of the same type, e.g. V24 adapters, but having codes characterized by a different level of release.

Actually, let us assume that a customer who has already plugged a first V24 and a first V35 adapter into the base machine may wish to change the first V24 adapter for a second V35 adapter, the latter having more or updated functions with respect to the first V35 adapter. Those new functions may come from an update of the code contained in the ROM elements included into the more recent adapter Now, the base machine being personalized with two V35 adapters, each one having code being of a different level of release, it is highly desirable that the base machine, i.e. the terminal adapter, be able to detect the more recent V35 adapter and to choose the corresponding code included therein in order to control the operating of both V35 adapters, taking profit of the updated technology for both.

Figure 1:
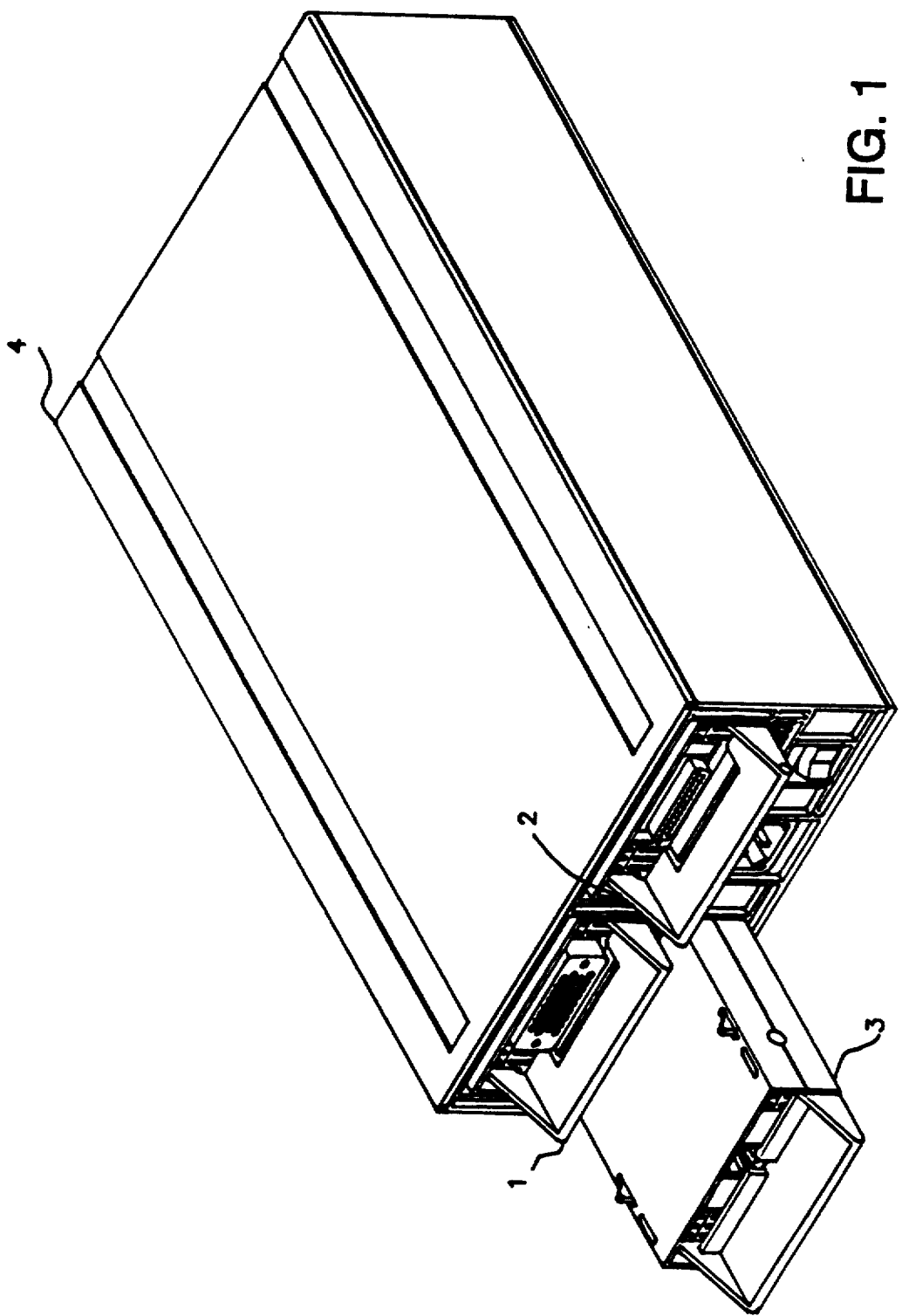
FIG. 1 is an example of a I.S.D.N. Terminal Adapter consisting of a base machine and its associated adapters.

FIG. 1 shows a example of a telecommunication equipment and particularly a Terminal Adapter for a I.S.D.N. network consisting of a base machine (4) designed to receive particular functional packages or adapters (1), (2) and (3), each adapter supporting a determined type of protocol such as V24, V35, X21 . . . as defined by the CCITT recommendations. In a processor based environment such as that used in the telecommunication products technology, the base machine and the different adapters will include a processor and storage means such as Read Only Memory elements (ROM), Non Volatile Random Access Memory elements (NVRAM), Random Access Memory elements (RAM), peripheric units . . . . The apparatus according to the invention, as will be described in detail hereinafter, provides and manages the different addressing signals, and particularly memory chip select (MCS) and peripheral chip select (PCS) signals in order to allow the connection of the adapters whatever their location and to make sure, if so, that the more updated code stored into one of the adapters is preferably used for all the adapters.

As mentioned above, the present invention allows each adapter being plugged to be located in any one of the available slots without any preassignment. In the case when two similar adapters, for instance of the type V35, have been plugged into the base machine, the apparatus according to the invention will detect whether both adapter have the same level of release, i.e. the same level of code contained into the ROM included in the adapters. If both levels are the same, each adapter will operate with its associated code included in the latter. If the codes contained into the two adapters have different levels of release, the apparatus according to the invention will detect the code of the higher level which will be used for both adapters. If the code contained in one adapter is in competition with a patch code that has been directly loaded into the base machine by means of the telecommunication network, the system according to the invention will choose the latter every time the base machine wishes to address this adapter.

FIGS. 3, 4, 5 and 6 are partial views describing the general structure of the preferred embodiment of the invention. The arrangement of these figures in order to provide the full drawing is shown in FIG. 2. As mentioned previously, and particularly with respect to FIG. 4 of the set of FIGS. 3, 4, 5 and 6, base 4 includes a processor 410 such as one of the 80186 INTEL series which communicates by means of a time multiplexed address and data bus 414 to a control logic 420, the selection of which is carried out by one chip select signal PCS0 generated by processor 410 on a lead 415. Bus 414 carries the Address/Data bus signals which constitute the time multiplexed memory or I/O address and data. Base 4 further includes memory storage elements and particularly a RAM 430, a non-volatil RAM 440 and a PROM 450, every element being addressable by means of chip select signals carried on a bus 416 and a bus 421 connected to a multiplexing/demultiplexing element 424 included in control logic 420. Bus 421 consists of a first address bus 422 and a second data bus 423, first and second bus, respectively, carrying the value of the address and the data. Both address and data values are provided after some demultiplexing processing carried out by multiplexing/demultiplexing element 424.

Figure 6:
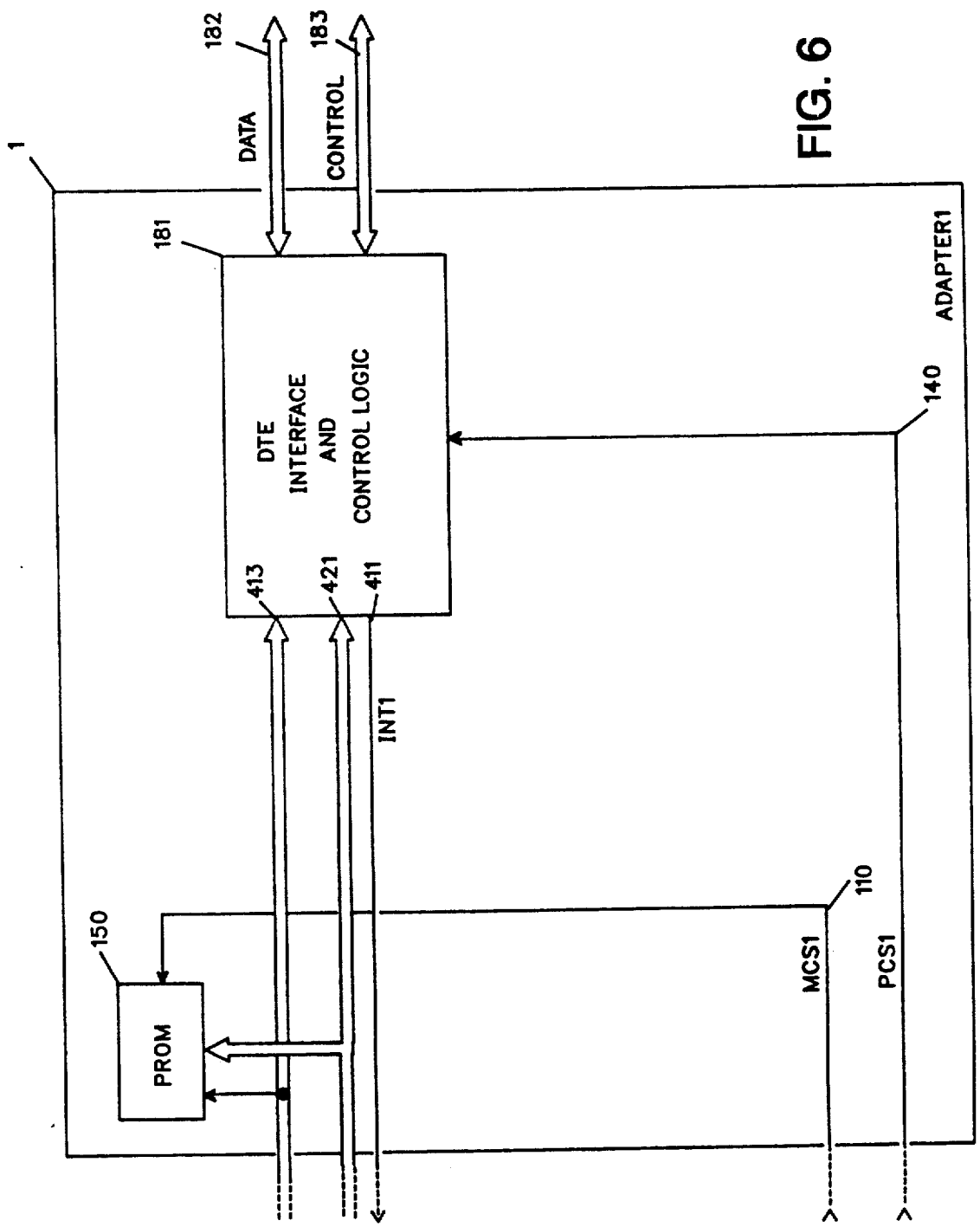

READ, WRITE and other control signals are provided by processor 410 on leads 413. Base 4 also communicates with adapters 1 and 2 by means of address and data busses 421, and READ/WRITE control leads 413. Adapter 1 (resp. adapter 2) described with respect to FIG. 5 (resp. FIG. 6) includes a Data Terminating Equipment DTE interface and control logic 181 (resp. DTE Interface and control logic 281) for interfacing the different data and control signals transmitted by busses 182 and 183 (resp. busses 282 and 283) thereby allowing the communication of one adapter with its associated DTE. With respect to CCITT V24 requirements, DTE interfaces and control logic 181 and 182 particularly manage signals such as "Data Terminal Ready" (DTR), "Ready To Send" (RTS), "Ready For Sending" (RFS), "Calling Indicator" (CI), clock and data signals . . . .

With respect to FIG. 4 again, Control logic 420 also includes a first set of two MCS registers 103 and 106, the two MCS registers being connected to data bus 423 and being respectively controlled by the output of 3-input AND gates 102 and 105. AND gate 102 has a first input connected to the output of a decode circuit 101, the input of which being connected to address bus 422. AND gate 102 has a second input connected to the WRITE control lead of control bus 413 and a third input connected to PCS0 lead 415 controlled by processor 410. Similarly, AND gate 105 has a first input connected to the output of a decode circuit 104, the input of which being connected to address bus 422. AND gate 105 has a second input connected to the WRITE control lead of control bus 413 and a third input connected to PCS0 lead 415 controlled by processor 410.

The output of MCS registers 103 and 106, both being 8-bit busses, is connected to an input of a comparator circuit 107, the latter comparator circuit 107 having a third input connected to the 8 most significant bits of address bus 422.

The output 110 of comparator circuit 107 carries the MCS1 control signal that will control the chip select of the storage element included into adapter plugged into slot 1, hereinafter called adapter 1.

Figure 3:
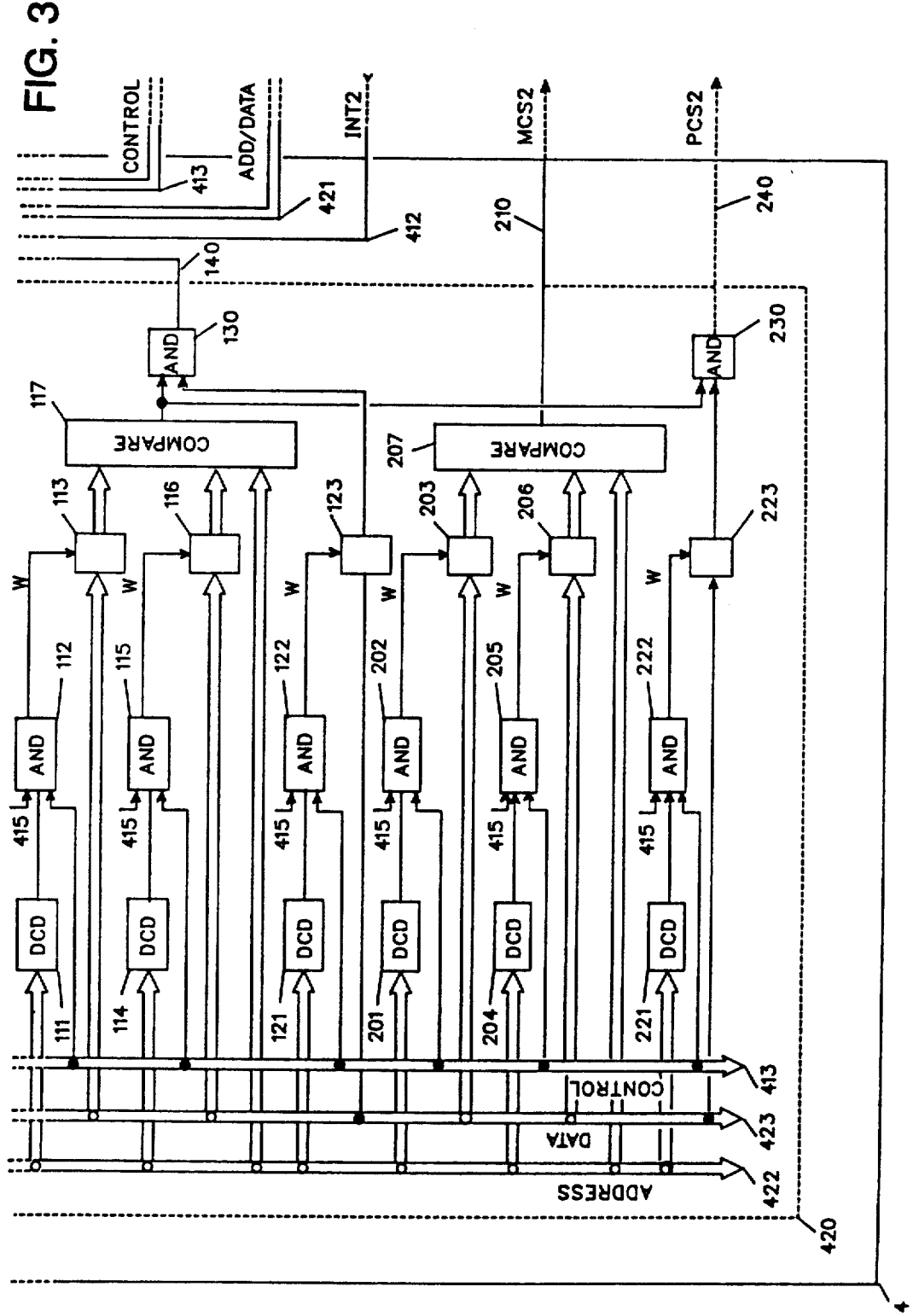
FIGS. 3, 4, 5 and 6 together are each partial views describing the general structure of the preferred embodiment of the invention.
Figure 4:
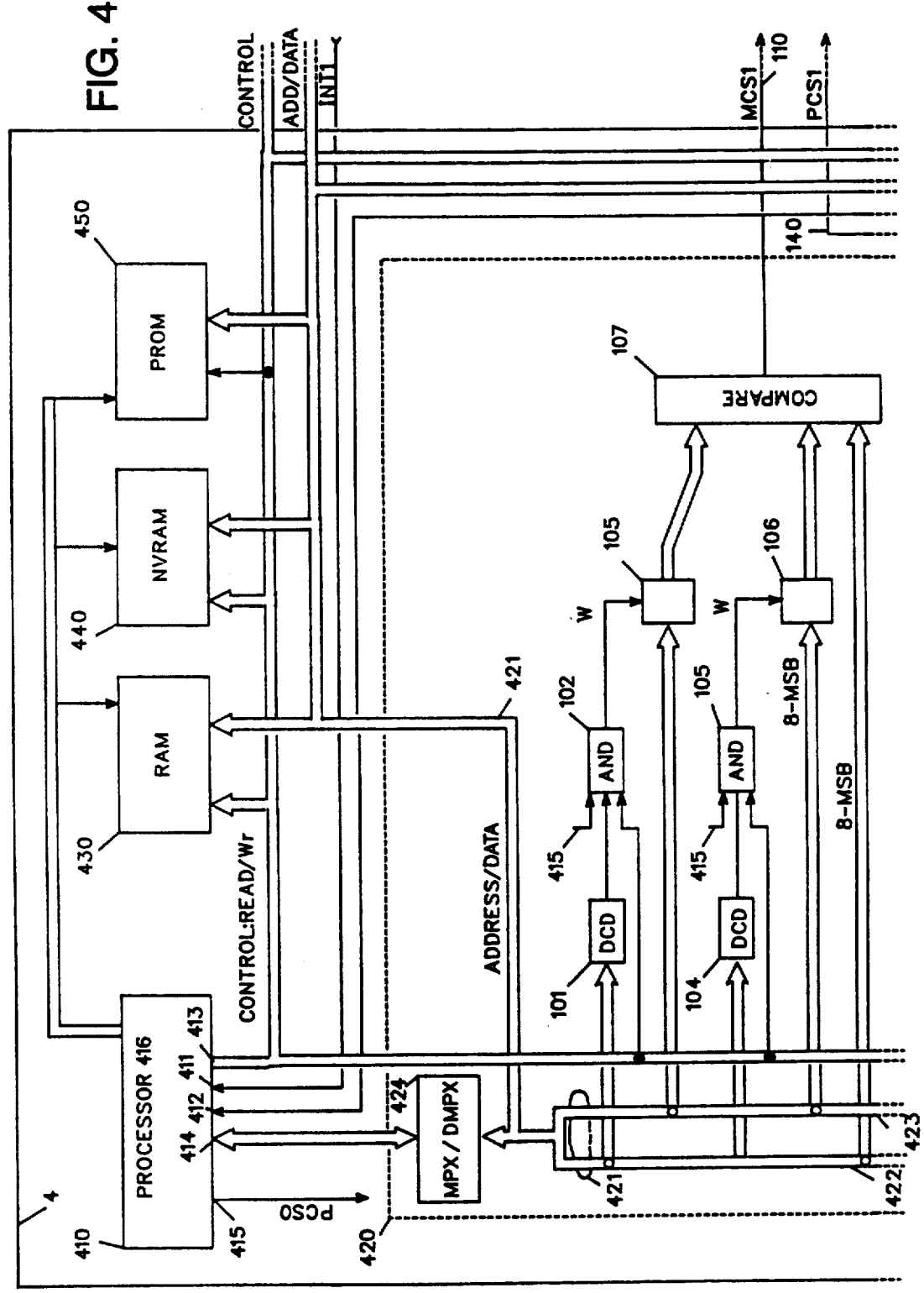
Figure 5:
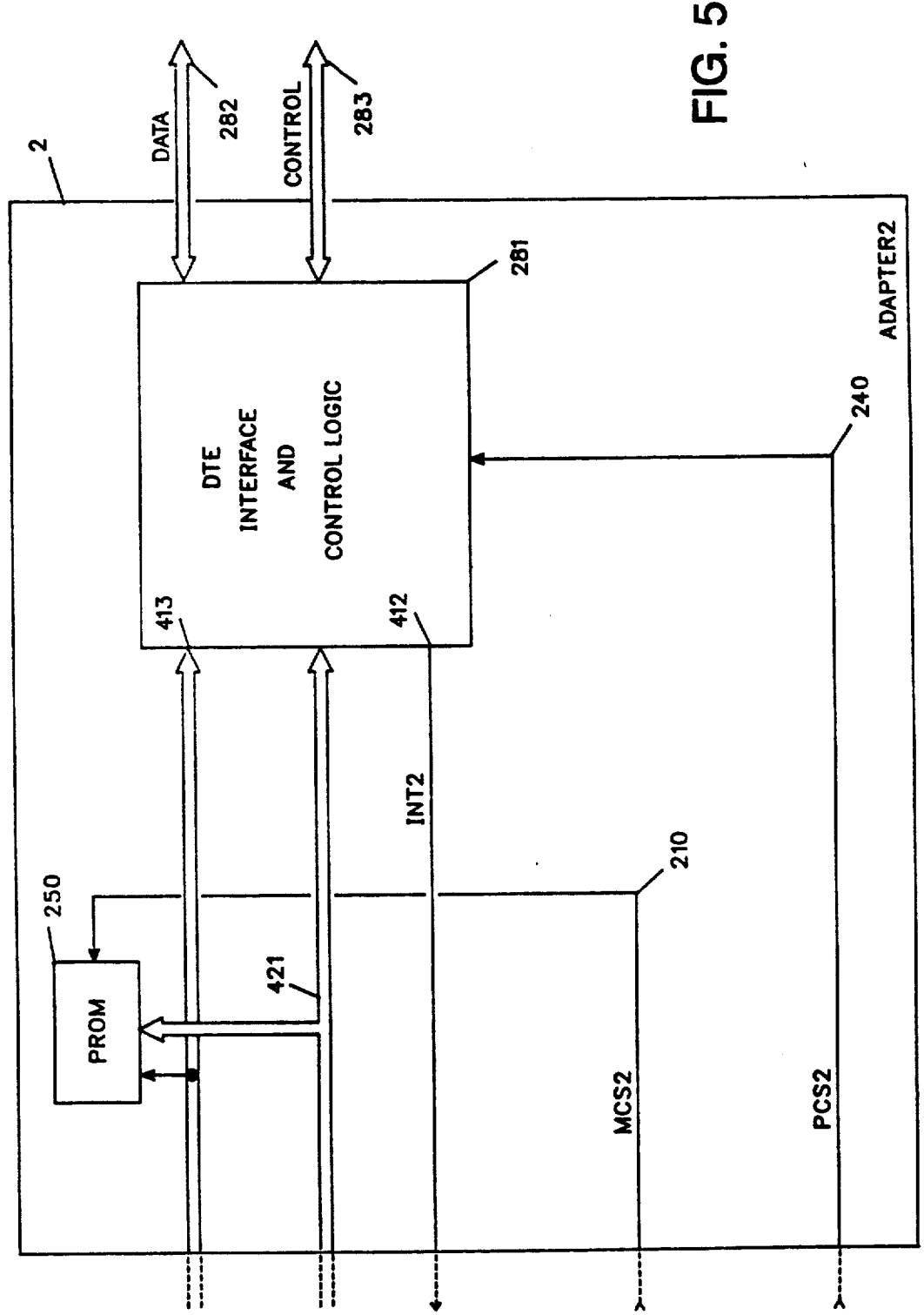

With respect to FIG. 3, control logic 420 also includes a first set of two PCS registers 113 and 116, the two PCS registers being connected to data bus 423 and being respectively controlled by the output of 3-input AND gates 112 and 115. AND gate 112 has a first input connected to the output of a decode circuit 111, the input of which being connected to address bus 422. AND gate 112 has a second input connected to the WRITE control lead of control bus 413 and a third input connected to PCS0 lead 415 controlled by processor 410. Similarly to the above, AND gate 115 has a first input connected to the output of a decode circuit 114, the input of which being connected to address bus 422. AND gate 115 has a second input connected to the WRITE control lead of control bus 413 and a third input connected to PCS0 lead 415 controlled by processor 410.

The output of PCS registers 113 and 116, both being a 8-bit bus, is connected to an input of a comparator circuit 117, the latter comparator circuit 117 having a third input connected to the 8 most significant bits of address bus 422.

Control logic 420 also includes a latch 123 having its input connected to one lead of data bus 423 and being controlled by 3-inputs AND gate 122. AND gate 122 has a first input connected to the output of a decode circuit 121, the input of which being connected to address bus 422. AND gate 122 also has a second input connected to the WRITE control lead of control bus 413 and a third input connected to PCS0 lead 415 controlled by processor 410.

The output of both comparator 117 and latch 123 is connected to AND gate 130 which eventually provides, on a lead 140, the peripheral chip select signal PCS1 allowing the control of the I/O circuits and particularly DTE interface and control logic 181 included in adapter 1. Similarly, control logic includes the following elements allowing the generation of the memory and peripheral chip select MCS2 and PCS2 signals in order to control the selection of the memory and the I/O circuits of adapters 2. Particularly, Control logic 420 includes a second set of two MCS registers 203 and 206, the two MCS registers being connected to data bus 423 and being respectively controlled by the output of 3-input AND gates 202 and 205. AND gate 202 has a first input connected to the output of a decode circuit 201, the input of which being connected to address bus 422. AND gate 202 has a second input connected to the WRITE control lead of control bus 413 and a third input connected to PCS0 lead 415 controlled by processor 410. Similarly, AND gate 205 has a first input connected to the output of a decode circuit 204, the input of which being connected to address bus 422. AND gate 205 has a second input connected to the WRITE control lead of control bus 413 and a third input connected to PCS0 lead 415 controlled by processor 410.

The output of MCS registers 203 and 206, both being a 8-bit bus, is connected to an input of a comparator circuit 207, the latter comparator circuit 207 having a third input connected to the least significant bits of address bus 422. The output 210 of comparator circuit 207 carries the MCS2 control signal that will control the chip select of the storage element included in adapter 2.

Control logic 420 eventually includes a latch 223 having its input connected to one lead of data bus 423 and being controlled by 3-input AND gate 222. AND gate 222 has a first input connected to the output of a decode circuit 221, the input of which being connected to address bus 422. AND gate 222 also has a second input connected to the WRITE control lead of control bus 413 and a third input connected to PCS0 lead 415 controlled by processor 410. The output of both comparator 117 and latch 223 is connected to an AND gate 230 which eventually provides, on a lead 240, the peripheral chip select signal PCS2 allowing the control of the I/O circuits of adapter 2, and particularly DTE interface and control logic 281 with respect to FIG. 5.

Now, with respect to FIG. 6 (resp. 5) adapter 1 further includes a PROM 150 (resp. 250) addressable by means of address and data busses 421 and Read/Write control leads 411. As will be described below with detail, control logic 420 performs the chip select generation for the memory and I/O elements of adapter 1 and particularly provides the MCS1 and PCS1 memory and peripheral chip select signals respectively on leads 110 and 140. Similarly, Control logic 420 provides MCS2 and PCS2 memory and peripheral chip select signals on leads 210 and 240 in adapter 2.

DTE interface 181 of adapter 1 and DTE interface 281 of adapter 2 respectively provides interrupt signals Int1 and Int2 to processor 410 through leads 411 and 412.

Figure 8:
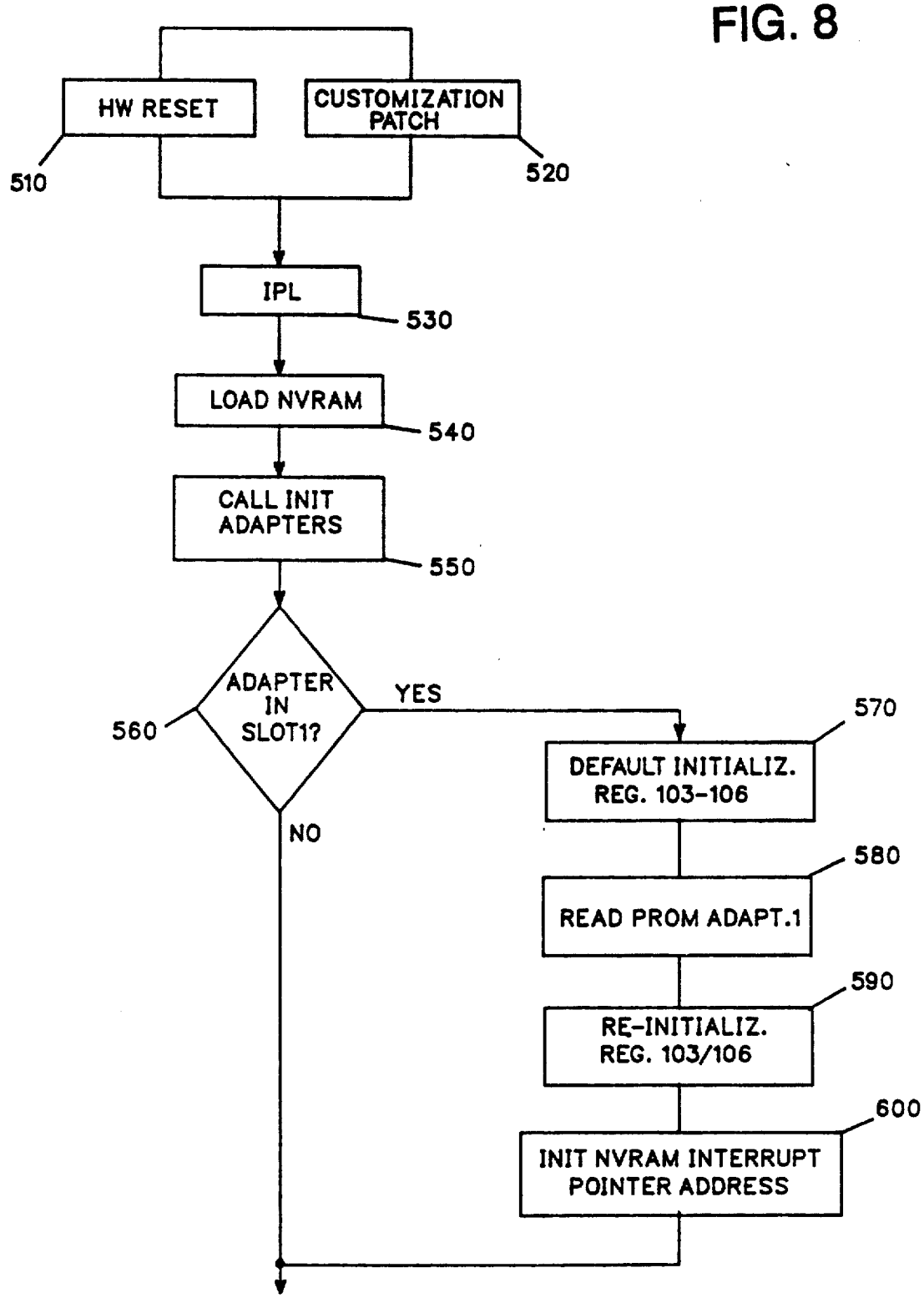
FIG. 8 and FIG. 9 together are flow charts detailing the different operations involved by the operating of the different elements to the invention.
Figure 9:
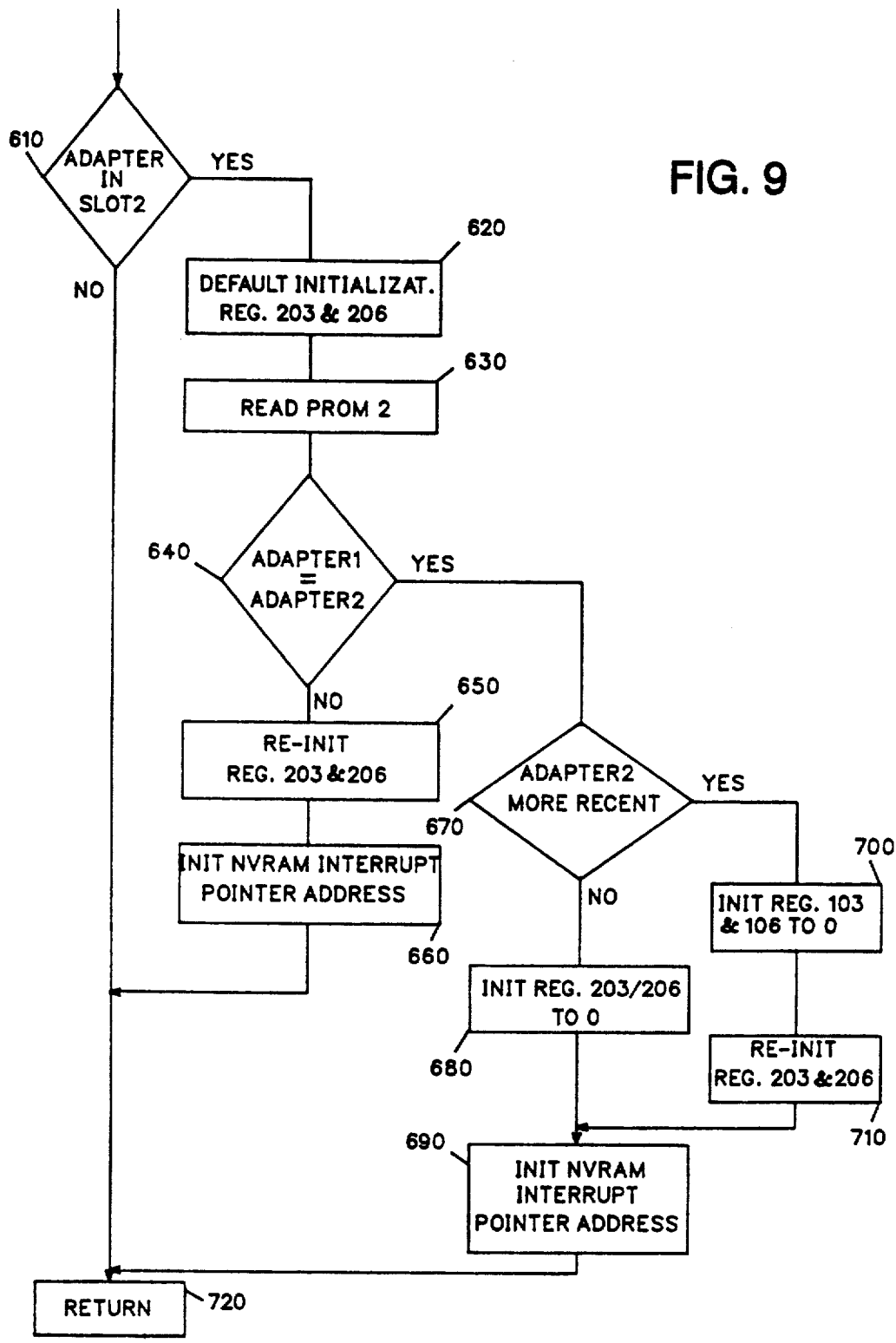
Figure 10:
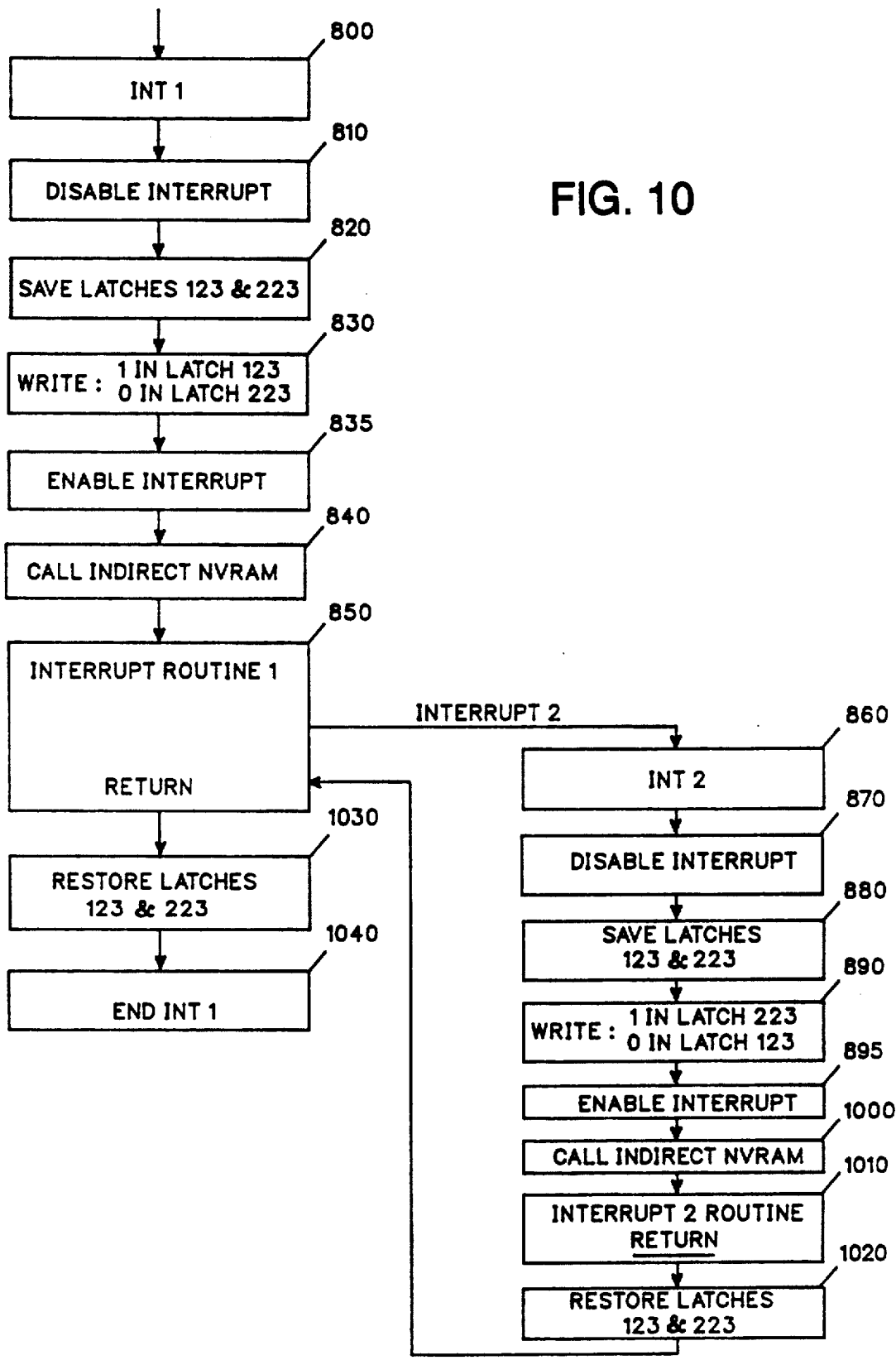
FIG. 10 illustrates the management and the calling of the different interrupt routines when one adapter generates an interruption to the processor.

FIG. 8, FIG. 9 and FIG. 10 are flow charts detailing the different operations involved by the operation of the different elements included in the base and the adapters in order to control the different chip select signals and to achieve the memory and peripheral chip selection in both the adapters and the base card.

With respect to FIG. 8 and 9, the preferred embodiment of the invention starts operating by a initialization phase. This initialization phase may follow a hardware reset e.g. a power on reset, step 510 in FIG. 8. The initialization phase may also follow a step of customization (520) in which the telecommunication network transmits to the Terminal Adapter a sequence of data, herein called a patch. This patch may include two distinctive types of information. A first type of information includes data relative to the customer environment and particularly data indicating the types of adapters plugged into the corresponding base machine. A second type of information includes sequences of data that will be loaded into the machine in order to supersede corresponding data already existing in the machine, and particularly the PROM elements included therein, but considered at the given time as being too ancient. If one hardware reset or a customization patch occurs, the whole system will enter into a Initial Program Loading (I.P.L) entailing a reinitialization phase (530) and beginning with the loading of the NVRAM element 440 included in base 4.

Figure 7:
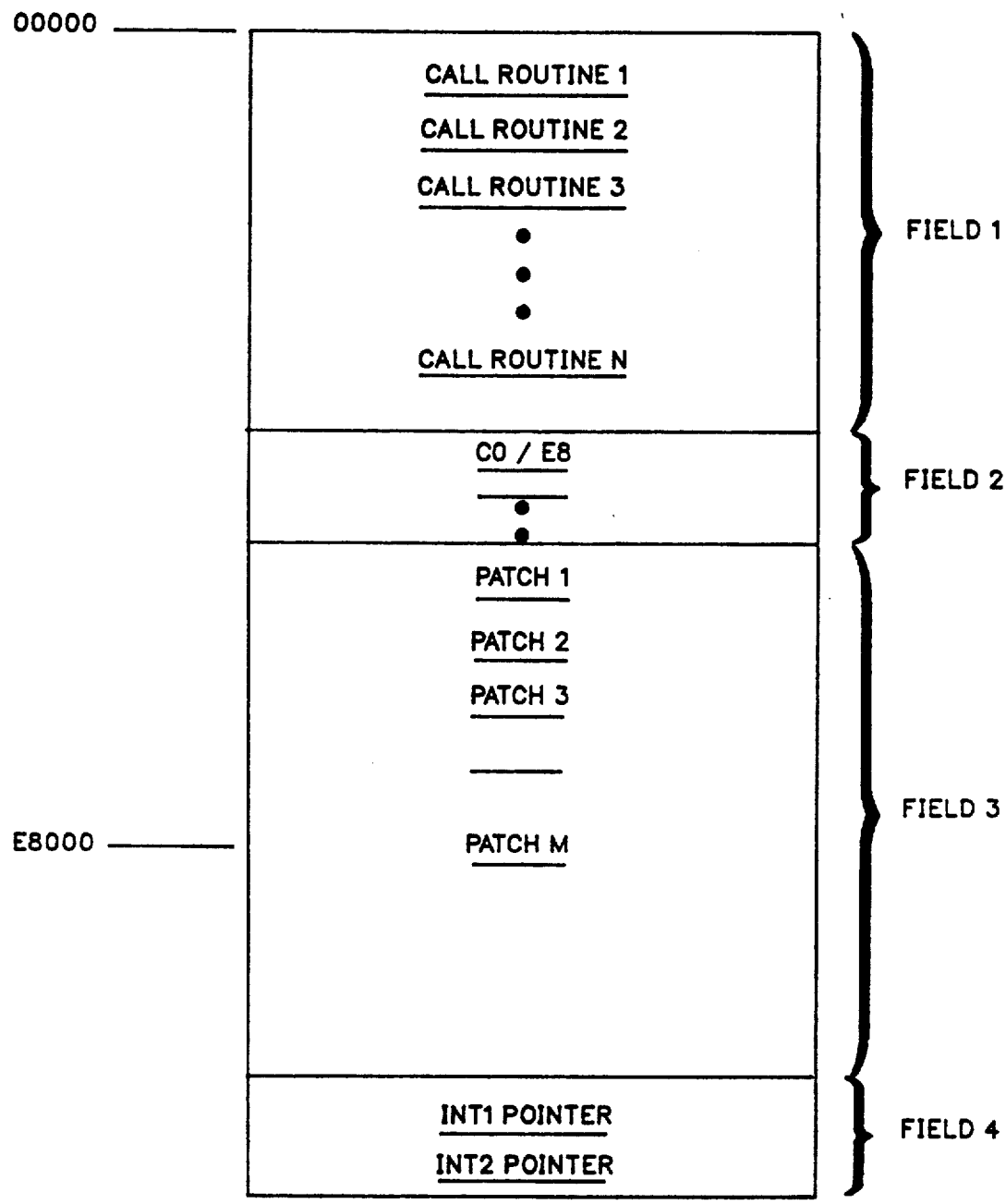
FIG. 7 illustrates the organization of NVRAM element 440.

The organization of NVRAM element 440 is particularly illustrated with respect to FIG. 7, NVRAM element 440 includes four main fields. The first field includes a sequence of call instructions, each call instruction being associated to a specific routine involved by the operating of the system. More precisely, this first field includes call instructions corresponding to most of the routines existing in the machine. However, routines corresponding to the processing of interrupt signals existing on leads 411 or 412, or more generally interrupt busses if so, are associated to data located in the fourth field of NVRAM element 440 as will be indicated hereinafter.

The second field appearing in the data organization of NVRAM element 440 consists in a table. The table gives the correspondance between the 8-MSB of the address of any interrupt routine existing, whatever it is based on, in PROM 150 or 250 and the 8-MSB of the address of the corresponding patch, if a patch corresponding to the latter interrupt routine already existing in the PROM is included in one adapter. The patch is located in the third field of NVRMM element 440. FIG. 7 particularly indicates that an interrupt routine existing in PROM element 150, for instance at the Hex. address "C0000" (the 8-MSB being "C0" in Hex.) is superseded by a patch- routine existing in the third field of NVRAM element 440 at the address "E8000" (the 8-MSB being "E8").

The third field appearing in the organization of NVRAM content includes the series of patches that have been loaded when received through the telecommunication network. It should be noted that if the second field is only dedicated to the interrupt routines involving the PROM elements of the adapters, the third field of NVRAM is, contrary to the second, affected by both interrupt and non interrupt routines.

The fourth field of NVRAM 440 includes the interrupt pointers of the different interrupt routines of the different adapters. In particular, referring back to the above example, the value of the interrupt pointer of adapter 1 is equal to "E8000" (in Hex.) since a patch code stored into NVRAM 440 supersedes the corresponding interrupt routine existing at the address "C0000" in PROM 150. On the contrary, the value of the interrupt pointer of adapter 1 would be "C0000" if no patch were present.

Now, referring back to FIG. 8, and having described the detail of the organization of NVRAM 440, the Initial Program Loading (I.P.L) of step 530 is followed by the loading of the first, second and third field of NVRAM 440, step 540. Then, step 550, processor 410 starts the initialization of the adapters and particularly performs the initialization of all registers included in the terminal adapter. To achieve this, a test is performed at step 560 in order to determine the presence of an adapter in slot 1, hereinafter called adapter 1. If an adapter has been plugged into slot 1, the plugging is detected by the voltage level existing on a lead (not shown) in the figures, processor 410 performs a default initialization of registers 103 and 106, step 570. Processor 410 initialize both MCS registers 103 and 106 at loading two different values, for instance respectively 10100000 ("A0" in hexadecimal) and 10110000 ("B0" in hexadecimal) in MCS register 103 and MCS register 106. To achieve this, and with respect to FIG. 4, processor 410 validates the PCS0 lead in order to select control logic 420 and generates the address of register 103 simultaneously with the byte "A0" on data bus 423. At the instant when processor 410 generates a WRITE control signal on control bus 413, AND gate 102 causes value "A0" to be loaded into MCS register 103. Then, processor 410, while continuing the activation of PCS0 lead, generates the address of register 103 which is decoded by decode circuit 104 while also generating value "B0" on data bus 423. When a WRITE control signal appears on control bus 413, AND gate 105 controls the loading of the latter value "B0" in register 103.

The set of two bytes "A0" and "B0" loaded into MCS registers 103 and 106 define a range of addresses, the address of the range starting from the value "A0000" (in hexadecimal) and the last address of the range preceding the value "B0000" (in hexadecimal). This set of two values that are loaded in MCS registers 103 and 106 therefore determines the range of address that will be associated with the memory elements included into adapter 1.

Then and with respect to FIG. 8 again, processor 410 performs a READ operation of PROM 150 of adapter 1 in order to determine all the features and parameters and particularly the type of the adapter (V24, V35 . . . ), the level of the release, etc., in step 580. To achieve this, processor 410 generates a sequence of addresses beginning with the address "A0000" and validates PCS lead 415. Since the most significant bits of the addresses of the sequence are comprised between the values "A0" (Hex.) and "B0" (Hex.), or in other words since the addresses of the sequence are comprised between the values "A0000" (Hex.) and "B0000" (Hex.), comparator 107 sets MCS1 lead 110 at a high level. This involves the selection of PROM 150 which generates a sequence of data on bus 421, the sequence of data being characteristic of the adapter 1. For instance this sequence of data includes a first field characteristic of the type of the adapter (V24, V35 . . . ), a second field characteristic of the level of the release, a third field characteristic of the address of the beginning of the link editor (for instance "C0000" (in Hex.)), a fourth field characteristic of the size of the code included into PROM 150.

From this information, processor 410 first checks the validity of the sequence of data in order to make sure that PROM 150 actually generates data. Moreover, in the preferred embodiment of the invention, processor 410 performs in the initialization period a test to determine whether the adapters, and particularly adapter 1, actually correspond to those specified by the customer. This customization can be performed locally or remotely, (during customization patch apply step 520 for instance), the machine being connected and receiving information directly through the telecommunication network.

From the above information, processor 410 also performs a reinitialization of both registers 103 and 106 in step 590, by loading a new set of two addresses. The first address of this new set of address is directly read from the third field and will correspond to the first address of the range of address dedicated to adapter 1. The second address of this new set is evaluated from the first address read from the third field and the size of the code loaded into PROM 150.

Among the features and parameters in the above sequence of data stored into PROM 150, processor 410 also reads the values of the addresses of the interrupt routines corresponding to adapter 1. Processor 410 determines whether the latter values, or more precisely the 8-MSB of the values, correspond to interrupt routines having been subject to a patch loaded in the above step 520. From this determination, processor 410 stores the value of the address of the interrupt routine existing in PROM 150, or the value of the address of the corresponding patch, if any. With respect to the example of FIG. 7, since the second field of NVRAM shows the existence of a patch corresponding to the interrupt routine existing at the Hex. address "C0000" in PROM 150, the patch being at the Hex. address "E8000, processor 410 will load into NVRAM 440 the Hex. value "E8000". The latter value, called interrupt 1 routine pointer with respect to FIG. 7, corresponds to the address to be generated as soon as DTE interface and control logic 181 sends an interrupt signal on interrupt lead 411. It should be noticed that the above description refers to a one-bit interrupt lead 411, but the same scheme applies in case of multiple interrupt leads.

Therefore, the value of the addresses of the interrupt routines existing either in PROM 150 or in an associated patch loaded into NVRAM 440 is stored in the above mentioned fourth field of NVRAM 440, at step 600. These interrupt routines will be called when adapter 1, and particularly DTE interface 181 included therein, generates an interrupt on lead 411 to processor 410. This may occur for instance when DTE interface- and control logic 181 detects the reception of a Serial Data Link Control SDLC frame. When the interrupt routine address pointer of adapter 1 has been recorded in NVRAM 440, or if the base has not detected an adapter plugged into the first slot, processor 410 performs a test to determine the presence of a second adapter plugged into base 4, at step 610 with respect to FIG. 9, in order to initialize MCS registers 203 and 206. If a second adapter has been plugged into the second slot available into the machine, processor 410 performs a default initialization of both MCS registers 203 and 206 by loading, similarly as before, a set of two values defining a second range of addresses which will be temporally associated with the memory elements included in adapter 2, at step 620. Then, at step 630, processor 410 determines the type of the adapter 2 by reading the corresponding sequence of data and comparing its type with that of adapter 1, at step 640. If the two adapters are of a different type, processor 410 stores into MCS registers 203 and 206 the set of two addresses extracted from the sequence of data read from the PROM included in adapter 2 in a similar way to that below, in step 650. Then, at step 660, processor 410 updates the fourth field of NVRAM element 440 by storing the interrupt routine address pointer of adapter 2. However, if the two adapters are of the same type, e.g. two V24 adapters, processor 410 proceeds to step 670 to determine the more recent adapter by comparing the level of the release of the code included in the PROM elements of both adapters. If adapter 2 is not the more recent adapter, processor 410 stores value "00" in MCS registers 203 and 206, or any address value that will prevent MCS2 lead 210 to be activated and the PROM element 250 included in adapter 2 to be addressed. Therefore, the code stored in the latter PROM element included into adapter 2 will never be used. On the contrary, if adapter 2 is more recent than adapter 1, processor 410 proceeds to step 700 in which processor 410 stores value "00" in MCS registers 103 and 106, or any address value that will prevent MCS2 lead 110 being activated to the PROM element 150.

The preferred embodiment of the invention also includes means to detect a failure in one adapter, for instance adapter 1, in order to re-initialize MCS registers 203 and 206, in addition to MCS registers 103 and 106, so as to address the more ancient but still operating PROM element included in adapter 2.

When the pairs of MCS registers (103/106) or 203/206) have been re-initialized with the right values, processor 410 proceeds to step 690 which performs a last update of the interrupt routine address pointers stored in the fourth field into NVRAM 440. This last update allows taking into account of the result of test performed in 670 in order to store the address of the more recent interrupt routines included in one of the two PROMS. Step 720 completes the process of initialization of base machine 4 and the adapters.

The period of initialization having been completed, the system according to the invention is now to able to address, when the main program stored in PROM 450 requests the running of a determined routine in one adapter, the corresponding routine existing either as a patch code in NVRAM 440 or in the PROM included in another adapter. Indeed, let us assume that the communication between one DTE connected to a V24 adapter requests the use of some routines included the latter V24 adapter. Then processor 410 accesses the first field of NVRAM 440 in order find the address of the routine requested. Three distinctive situations may then occur:

a first situation characterized in the fact that the desired routine is only available in PROM 150 may occur. In this case, the address found from the first field of NVRAM 440 is comprised within the first range of addresses, the latter range being defined with respect to the content of MCS register 103/106. This entails the output of comparator circuit 107 be validated and address directly PROM 150.

a second situation characterized in the fact that the desired routine is available in PROM 1 but also, with a higher level of release, in the PROM element of the second adapter, the latter adapter being of the same type of the first one. In this case, the address found from the first field of NVRAM containing the list of call instructions of most routines used in the machine is comprised within the second range of addresses defined with respect to the content of the second set of MCS registers 203/208. Consequently, the output of comparator circuit 207 is set to a high level, what entails the selection of PROM 250.

a third situation characterized in the fact that the requested routine is part of the patch code stored in NVRAM 440 and transmitted directly through the telecommunication network. In this case, the call instruction included into the first field of NVRAM 440 refers to an address, the value of which being out of the first and second ranges above defined, but referring directly to the patch routine located in the third field of NVRAM 440.

Consequently, the system according to the invention allows the management of routines and codes in general in order to select the one having the higher level of release or the one not stored in a PROM element likely to be old-fashioned but directly loaded through the telecommunication network. Thus, each adapter generally operating with its associated code included therein, becomes capable of using for its own purpose the higher release level code included in another adapter or a patch code directly loaded through the network.

FIG. 10 illustrates the management and the calling of the different interrupt routines when one adapter generates an interruption to processor 410. Assuming that adapter 1 be a V24 type adapter and that the communication between the terminal adapter and the DTE be in a data receiving phase. Let us also assume that during a communication session between a DTE and the telecommunication network, adapter 1 and particularly DTE interface and control logic 181 generates an interrupt to processor 410 via interrupt lead 411. This may occur for instance at the reception by adapter 1 of a Serial Data Link Control (SDLC) frame, or when any event which requires immediate processing, occurs. It should be noticed that interrupt lead 411 could be implemented as an interrupt bus included several prioritized or not, maskable or not interrupt leads. As soon as the interrupt is detected, processor 410 performs the processing of this interrupt coming from a determined slot existing in base machine 4, step 800. This is followed by an interrupt disabling step 810 in order to prevent any other interruption.

Processor 410 saves in an internal register the value existing in PCS latch 123 and then particularly addresses PROM 450 included in base machine 4 in order to determine the new value to store in PCS latch 123.

Processor 410 saves in an internal register the content of latches 123 and 223 step 820. Then processor reads PROM 450 in order to determine the new set of values to store in latches 123 and 223. Since the interrupt has come from adapter 1, processor 410 stores the bit "1" in latch 123 and the bit "0" in latch 223. When the initialization of latches 123 and 223 completes, processor 410 enables again the possibility of interruptions coming from leads or busses 411 and 412, step 835.

Then, step 840, processor 410 performs a indirect call operation through NVRAM 440, i.e. reads the content of the said fourth field of the NVRAM, this content characterizing the address of the CALL operation, the latter content corresponding to the beginning address of the interrupt routine stored either in PROM 150 if no patch code has been loaded and 440 if one patch code has been loaded with respect to step, 520. Referring back to the above example, processor 410 calls the interrupt routine located at the address "E8000", i.e. into NVRAM 440, since a patch code has been loaded directly through the telecommunication network. In the reverse case, i.e. no patch code existing into NVRAM 440 and the value of the interrupt pointer of adapter 1 being equal to "C0000", processor 410 would perform a call operation to a interrupt routine located at the address address "C0000", i.e. located into PROM 150.

The interrupt routine may then begin step 850, be it associated either with code included in PROM 150, PROM 250 or with patch code stored in NVRAM 440 according to the preceding mechanism. It may include different steps allowing the management of the considered interrupt and particularly the reception of the Serial Data Link Control (SDLC) frame. For instance, one of these steps will consist in the reading by Processor 410 of the state of DTE interface 181 and particularly the value of the Frame Checking Sequence (FCS) located at the end of the frame, the reading of which allows the checking of the integrity of the sequence of data. If the FCS appears to be incorrect, DTE interface 181 will request the re-transmission of the invalid SDLC frame. It should be noted that during the processing of the interrupt routine with respect to step 850, processor 410 will address automatically the DTE interface and control logic 181 which has generated the interruption and not the other. This is achieved by means of the operation of compare circuit 117, latches 123 and 223 and their respectively associated AND gates, i.e. AND gates 130 and 230. Indeed, when processor 410 generates addresses within the range of values as defined by the content of registers 113 and 116 in order to address the peripheral interface, the content of compare circuit 117 is set to a high level. Since latches 123 and 223 have, respectively, been set to a high and low level, PCS1 signal on lead 140 is set to a high level while on the contrary, PCS2 signal on lead 240 is set to a low signal. Consequently, processor 410 addresses automatically the right adapter that has requested some interruption process. The benefit of this is major since it should be noted that the same program managing the interrupts coming from the adapter 1 can directly be used to manage the interrupts coming from adapter 2. This eventually allows the saving of a great deal of software and program code since the program can be designed as if only one adapter were connected to base machine 4. The final advantage is considerable in terms of code development and storage cost reductions.

When the interrupt routine 850 completes, processor 410 restores the values that were loaded in latches 123 and 223 before the interruption occurred, step 1030. The process of the interruption then completes, step 1040.

FIG. 10 particularly illustrates a case in which the interrupt routine performed with respect to step 850 is interrupted by an interruption generated by DTE interface and control logic 281 on lead 412. This interruption generated by adapter 2 will then entail a second phase of interruption process. Indeed, assuming that DTE interface and control logic 281 generates an interrupt signal INT2 to processor 410 by means of lead 412, processor 410 proceeds to step 860 in order to start the process of the second interruption. Step 860 is then followed by a disable interrupt step 870 which prevents other interrupt disturbing the system at the moment when processor saves the content of latches 123 and 223 in internal registers, step 880. Then, similarly to that above, processor 410 addresses PROM 450 in order to fetch the new set of values to be stored in PCS latch 123 and 223. Since an interrupt routine of the second adapter needs to be performed, processor 410 respectively loads a a ONE into latch 223 and a ZERO into latch 123, step 890. As soon as these operations are performed, the interruptions are again authorized, step 895. Then, processor performs a indirect CALL operation in NVRAM 440, step 1000. Similarly than above, processor 410 reads the content of the said fourth field of the NVRAM, this content characterizing the address of the CALL operation, be it located in PROM 150, PROM 250 or NVRAM 440 in case of the existence of patch code.

At the completion of routine 1010 which has been requested by adapter 2, processor 410 restores the values that were loaded into latches 123 and 223 before the interruption occurred in step 1020. Then, processor 410 proceeds to the processing of interrupt routine 850 of adapter 1. The sequence of the operations performed then is similar to the case when no interrupt coming from the second adapter occurs, i.e. includes both step 1030 and 1040.

It should be noticed that the invention allows easy succession of different interruption without necessitating that the corresponding interruption routines take into account the number of adapters plugged into the machine or the possibility of a succession of interrupts. In other words, each interrupt routine may be designed, written and stored in the storage elements as if it were only designed for one adapter and one interruption at a time. As mentioned above, the advantage in terms of memory storage and development cost reduction si considerable.

It should be also noticed that the apparatus according to the invention may be used when a defined machine has to operate with different pluggable adapters, the adapter being characterized by different level of releases.

We claim:

1. Memory and peripheral chip select apparatus allowing the addressing of different memory and peripheral elements by a processor (410), said processor (410) addressing first memory elements and first peripheral elements (150,181) located in a first adapter pluggable into a base machine (4), said processor (410) addressing second memory elements and second peripheral elements (250,281) located in a second adapter pluggable into said base machine (4), said processor (410) further addressing third memory elements and third peripheral elements (420,430,440,450) located in said base machine (4), said first and second memory elements including code of one or more types and levels of release, and including means (410) for reading the types and levels of release of said code included in said first and second adapters, means (420) connected to said means (410) for reading and receiving therefrom the results of said reading, said means (420) operating, when said code in both said first and said second adapters are of the same type, for selecting for access the said code in the one of said first or second memory means which has said code of said higher level of release when code of said type which is found to be the same in both said first and second adapters is desired to be accessed by said processor (410) and further including:

first storage means (103,106) for storing a first set of addresses values defining a first range of addresses which validates a MCS1 chip select signal (110) affected to the selection of said first memory element (150) included into said first adapter (1), said first storage means being initialized with values evaluated from a read operation of the characteristic parts of said first memory elements (150) of said first adapter (1), second storage means (203,206) for storing a second set of address values defining a second range of addresses which validates a MCS2 chip select signal (210) affected to the selection of a second memory element (250) included in said second adapter (2), said second storage means being initialized with values evaluated from a read operation of the characteristic parts of said second memory elements (250) of said second adapter (2), means (410,440,450,640,670) active when said first and said second adapters are of the same type for determining which of said first and second memory elements included into said adapters has the higher level of release, means responsive to said determination for performing a reinitialization of said first and said second address storage means in order to enable the selection of the memory element included in one of said adapter having the higher level of release when a defined routine is requested and to disable the selection of the memory element having a lower level of release.

2. Apparatus according to claim 1 characterized in that said base machine (4) is an equipment allowing the connection of a Data Terminating Equipment to a telecommunication network.

3. Apparatus according to claim 2 characterized in that said base machine (4) further includes:

means (440) for storing sequences of data representing patch routines transmitted through said telecommunication network and updating parts of routines stored into said storage element (450) or said first and second memory elements (150, 250), means (410, 440) for calling an defined patch routine in place of a corresponding routine located into said storage element (459) or said first and second memory elements (150, 250).

4. Apparatus according to claim 2 characterized in that it further includes:

a third storage means (113, 116) for storing a third set of address values for defining a third range of addresses affected to the selection of one among the peripheral elements included into said adapters, fourth storage means (123, 223) for storing data representative of the affectation at a given instant, of said third range of addresses to one among said peripheral elements (181, 281), means (130, 230) for generating a first PCS1 (140) peripheral chip select control signal and a second PCS2 peripheral chip select control signal allowing the selection of one among said peripheral elements included in said adapters when said processor (410) generates an address comprised within said third range of addresses, means (410, 450) responsive to an interruption generated by one among said peripheral elements for saving the content of said fourth storage means, means (410, 450) for loading a new set of values in said fourth storage means (123, 223), said new set of values corresponding to the peripheral element (181, 281) which has generated said interruption and which requires an interrupt management routine, means for calling said interrupt routine corresponding to said interruption, means for restoring said saved data into said fourth storages means (123, 223) when said interruption routine completes, whereby said processor manages said peripheral elements as if only one were connected and involved in the operating.

5. Memory and peripheral chip select apparatus allowing the addressing of different memory and peripheral elements by a processor (410), said processor (410) addressing first memory elements and first peripheral elements (150, 181) located in a first adapter pluggable into a base machine (4), said processor (410) addressing second memory elements and second peripheral elements (250, 281) located in a second adapter pluggable into said base machine (4), said processor 410 further addressing third memory elements and third peripheral elements (420, 430, 440, 450) located in said base machine (4), said apparatus being characterized in the fact that it further includes:

first storage means (103, 106) for storing a first set of addresses values defining a first range of addresses which validates a MCS1 chip select signal (110) affected to the selection of said first memory element (150) included in said first adapter (1), second means (203, 206) for storing a second set of address values for defining a second range of addresses which validates a MCS2 chip select signal (210) affected to the selection of said second memory element (250) included in said second adapter (2), means (410, 450) for initializing said first storage means (103/106) in order to address and perform a first READ operation of said first memory means (150) whereby determining the characteristics and the type of said first adapter (1), means (410, 450) for initializing said second storage means (203/206) in order to address and perform a second READ operation of said second memory means (250) whereby determining the characteristics and the type of said second adapter (2), means (410, 450) activated when said first (1) and said second (2) adapter are of different types for reinitializing said first storage means (103/106) and said second storage means (203/206) with new values respectively evaluated from said first and second READ operations in order to affect a new range of address to each of said first and second memory elements (150, 250) corresponding to the type of the adapter, means (410, 450) activated when said first (1) and said second (2) adapter are of the same type for determining which of said first and second memory elements (150, 250) has the higher level of release and for reinitializing said said first storage means (103, 106) and said second storage means (203/206) with new values whereby the memory elements (103/106, 203/206) associated to the adapter having the higher level of release are selected for both the operating of said first and said second adapter (1) (2).

6. Memory and peripheral chip select apparatus according to claim 5 characterized in that said base machine (4) is an equipment allowing the connection of a Data Terminating Equipment to a telecommunication network.

7. Memory and peripheral chip select apparatus according to claim 6 characterized in that said base machine (4) further includes:

means (440) for storing the addresses and the data of patch codes updating some of the routines existing in said first or said second or said third memory elements, said patch codes being transmitted directly through said telecommunication network.

means for selecting said patch code in place of the corresponding existing routine located in the memory elements (103/106, 203/206) associated to the adapter having the higher level of release.

8. Memory and peripheral chip select apparatus according to claim 6 or 7 and characterized in the fact said base (4) further includes:

third storage means (113, 116) for storing a third set of addresses values defining a third range of addresses affected to the selection of said first (181) or said second (281) peripheral element respectively included in said first (1) and second (2) adapter, fourth storage means (123,223) for storing data representative of the affectation at a given instant, of said third range of addresses to one among said peripheral elements (181, 281)

means (130, 230) for generating a first PCS1 peripheral chip select control signal and a second PCS2 peripheral chip select control signal allowing the selection of said first and said second peripheral elements (181, 182), means (410, 450) responsive to an interruption generated by one among said peripheral elements for saving the content of said fourth storage means, means (410, 450) for loading a new set of values in said fourth storage means (123, 223), said new set of values corresponding to the peripheral element (181, 281) which has generated said interruption and which requires an interruption management routine, means for calling said interrupt routine corresponding to said interruption, means for restoring said saved data in said fourth storage means (123, 223) when said interruption routine completes whereby said processor manages said peripheral elements as if only one were connected and involved in the operating.

* * * * *